(No Model.)

J. G. F. L. DIETER.
SPRING BUFFER FOR GRAIN METER BUCKETS.

No. 244,562. Patented July 19, 1881.

Attest:

Inventor
J. G. F. Louis Dieter
by Wood & Boyd
his Attorneys

United States Patent Office.

J. G. F. LOUIS DIETER, OF CINCINNATI, OHIO, ASSIGNOR TO HIMSELF AND SIMPSON & GAULT, OF SAME PLACE.

SPRING-BUFFER FOR GRAIN-METER BUCKETS.

SPECIFICATION forming part of Letters Patent No. 244,562, dated July 19, 1881.

Application filed April 23, 1881. (No model.)

*To all whom it may concern:*

Be it known that I, J. G. F. LOUIS DIETER, a citizen of the United States, residing at Cincinnati, in the county of Hamilton and State of Ohio, have invented certain new and useful Improvements in Automatic Scales, of which the following is a specification.

This invention relates to improvements in the revolving buckets of automatic grain or liquid scales; and the objects of the present invention are to relieve the automatic weighing devices from heavy shocks, caused by suddenly stopping the revolving bucket, and to provide for the positive operation of the parts.

To these ends the first part of my invention consists in the employment of a spring attached to the automatic stopping device, so arranged that a gradual stoppage or slowing motion of the revolving buckets is attained; and the second part of my invention consists in a guide-block arranged in such relation to the automatic stop as to secure a positive contact of the stopping devices, all of which will be fully hereinafter described.

Figure 1:
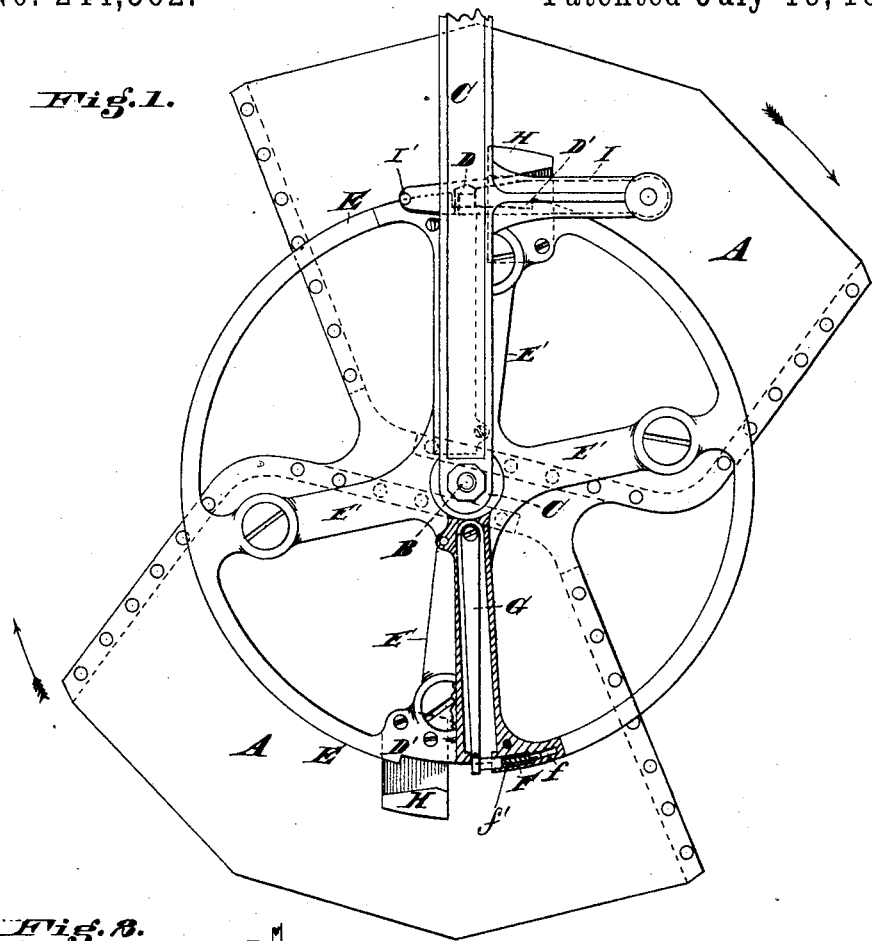
Figure 2:
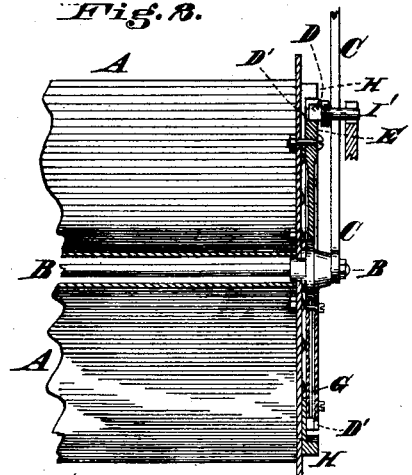
Figure 4:
Figure 3:
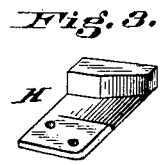

In the accompanying drawings, Figure 1 represents a side elevation of a revolving bucket embodying my invention. Fig. 2 is a vertical central sectional view, showing a portion of the buckets broken away; Fig. 3, a perspective view of one of the guide-blocks; and Fig. 4, a perspective view of the lever and spring device.

The letters A A indicate two buckets, which are journaled so as to revolve upon a shaft, B, supported in the lower ends of suspension-rods, one of which, C, is represented in Fig. 1, a similar rod being at the opposite ends of the buckets. These suspension-rods are supported at their upper ends on knife-edge bearings provided on a counterbalance-beam of a weighing mechanism; but, as this is usual in this class of machines, I do not deem it necessary to here illustrate the same. These parts are so arranged that when a given weight of material is filled into one of the buckets the latter descends a sufficient distance to release a dog, D, from engagement with a segmental notch, D', provided in the periphery of a circular rim, E, which is rigidly bolted or otherwise attached to one end of the buckets A.

The dog D is made in the form of a lug projecting laterally from the end of an arm, I, which is pivoted at its other end to a suitable part of the supporting frame-work. (Not necessary to here illustrate.)

In order to avoid the shocks occasioned by the sudden stoppage of the revolving buckets, I elongate or extend the notch D' a sufficient distance to permit the bucket to travel a short distance after the dog D falls into the notch on the return movement of one of the buckets, and cause said dog to strike the spring device, which effects the gradual and yielding stoppage of the bucket. This spring device consists of a coiled spring, F, preferably supported and sustained in a segmental groove or recess, *f*, formed or provided in the circular rim E.

To secure the proper and effective movements of the parts the spring is attached or made to rest against the lower end of the arm G, which is pivoted at its upper end in one of the bars E' of the rim E, and said arm G is interposed between the part of the notch where the dog D first enters and the spring, and the arm is further provided with a rod, *f'*, to sustain the coil of the spring F. The object of this arrangement of the spring with the arm G is to cause the spring to move in the arc of a circle and permit the dog D to strike against it and be released without radial strain on the spring, which radial strain is sustained by the arm G.

The letters H H indicate guide-blocks, which are secured to the buckets at a point above the pivoted arm I, which carries the dog D, these blocks serving to force the dog into engagement with the notches D' as said blocks successively pass over the dog, thereby positively operating said dog and causing it to strike the spring device.

The velocity of the revolving bucket is sufficient to cause severe shocks, unless suitable means be interposed to permit a gradual slowing or yielding motion to occur when the revolution of the buckets is to be stopped, and it has been found that rubber buffers and similar devices are entirely inadequate to accomplish this result; but by elongating the notches D' and providing a spring device which strikes the locking-dog D and then yields to a considerable extent, permitting the buckets to travel a short distance, I provide efficient means for gradually checking and finally stopping the buckets, and thereby avoid sudden shocks. This is an important feature in automatic scales, and essential to secure accuracy and durability.

I have described the spring device as applied adjacent to one of the notches D'; but it will, of course, be evident that a similar arrangement is employed adjacent to each notch. And, further, I have not illustrated the supporting frame-work of the machine that supports the pin I' of the arm I and prevents it and the dog from downward movement with the buckets, as such features are of the usual construction.

What I claim as my invention, and desire to secure by Letters Patent, is—

1. In an automatic scale provided with a revolving bucket, the combination of the coiled spring F with the elongated notch D' and the dog D, substantially as described.

2. In an automatic scale provided with a revolving bucket, the combination of the coiled spring F and arm G with the elongated notch D' and the dog D, substantially as described.

3. The combination, with the grain-bucket, of the guide-blocks H, dog D, and notch D', substantially as described.

In testimony whereof I have hereunto set my hand in the presence of two subscribing witnesses.

J. G. F. LOUIS DIETER.

Witnesses:
JNO. E. JONES,
EUGENE L. FIRNKOESS.